US007089108B2

(12) United States Patent
Merritt

(10) Patent No.: US 7,089,108 B2
(45) Date of Patent: Aug. 8, 2006

(54) METHOD AND APPARATUS FOR ENTERING A FLIGHT PLAN INTO AN AIRCRAFT NAVIGATION SYSTEM

(75) Inventor: J. Scott Merritt, Delmar, NY (US)

(73) Assignee: VoiceFlight Systems, Inc., Delmar, NY (US)

( * ) Notice: Subject to any disclaimer, the term of this patent is extended or adjusted under 35 U.S.C. 154(b) by 278 days.

(21) Appl. No.: 10/799,965

(22) Filed: Mar. 12, 2004

(65) Prior Publication Data

US 2005/0203700 A1 Sep. 15, 2005

(51) Int. Cl.
*G01C 21/26* (2006.01)

(52) U.S. Cl. ............................ 701/206; 701/3; 701/13; 244/158.1

(58) Field of Classification Search .................... 701/3, 701/4, 13, 23, 33, 200, 206; 244/158.1
See application file for complete search history.

(56) References Cited

U.S. PATENT DOCUMENTS 6,905,091 B1 * 6/2005 Berson et al. .............. 244/1 N

OTHER PUBLICATIONS

D. Kim, S. Lee, and R. M. Kil, "Auditory processing of speech signals for robust speech recognition in real-world noisy environments", IEEE Trans. Speech Audio Processing, vol. 7, No. 1, pp. 55-69, Jan. 999, USA.

S. Basu, "A linked-HMM model for robust voicing and speech detection", Proc. Int. Conf. Acoustic, Speech, and Signal Processing (ICASSP), vol. 1, pp. 816-819, 2003, USA.

* cited by examiner

*Primary Examiner*—Gertrude A. Jeanglaude

(57) ABSTRACT

An apparatus for entering a flight plan into an aircraft navigation system, the apparatus comprising: an acoustic sampler adapted for sampling a microphone signal and generating an acoustic signal; a waypoint identifier adapted for generating an identified waypoint from the acoustic signal and the flight plan; and a navigation interface adapted for incorporating the identified waypoint into the flight plan and for transmitting and receiving navigation data to and from the aircraft navigation system.

22 Claims, 6 Drawing Sheets

METHOD AND APPARATUS FOR ENTERING A FLIGHT PLAN INTO AN AIRCRAFT NAVIGATION SYSTEM

BACKGROUND

The present invention relates generally to the field of speech recognition and more specifically to the use of speech recognition to enter a flight plan into an aircraft navigation system.

Recent advances in navigation devices for General Aviation (GA) aircraft have allowed these devices to convey a great deal of valuable information to the pilot. These devices share a common weakness, however, in their ability to accept detailed information back from the pilot. This weakness is particularly acute with regard to the entry of waypoints for a typical instrument flight plan.

In typical current designs, panel space restrictions have forced avionics designers to use concentric knobs for waypoint identifier entry. Current procedures for entering a flight plan entail rotating a knob through the entire alpha-numeric alphabet for each character in each waypoint. For complex flight plans, such procedures are cumbersome and time consuming and significantly interfere with the pilot's need to scan instrument gauges, maintain visual separation from other aircraft, and attend to other critical tasks.

Opportunities exist, therefore, to improve safety and efficiency in the piloting of GA aircraft by providing a speech recognition interface for entering a flight plan into the aircraft navigation system.

SUMMARY

The opportunities described above are addressed, in one embodiment of the present invention, by an apparatus for entering a flight plan into an aircraft navigation system, the apparatus comprising: an acoustic sampler adapted for sampling a microphone signal and generating an acoustic signal; a waypoint identifier adapted for generating an identified waypoint from the acoustic signal and the flight plan; and a navigation interface adapted for incorporating the identified waypoint into the flight plan and for transmitting and receiving navigation data to and from the aircraft navigation system.

Another aspect of the present invention is embodied by a method for entering a flight plan into an aircraft navigation system, the method comprising the acts of: sampling a microphone signal; generating an acoustic signal; generating an identified waypoint from the acoustic signal and the flight plan; incorporating the identified waypoint into the flight plan; and transmitting and receiving navigation data to and from the aircraft navigation system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
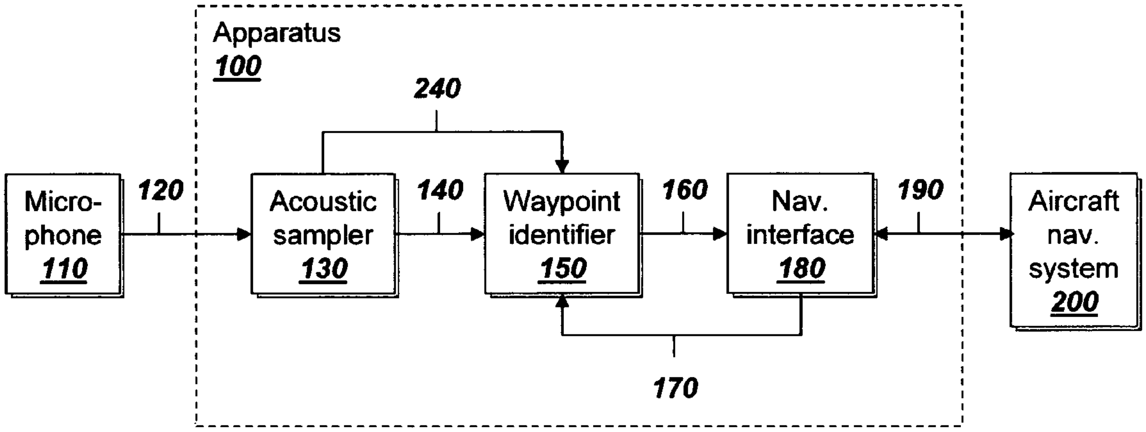
FIG. 1 illustrates a block diagram in accordance with one embodiment of the present invention.

In accordance with one embodiment of the present invention, FIG. 1 illustrates a block diagram of an apparatus 100 for entering a flight plan 170 into an aircraft navigation system 200. Apparatus 100 comprises an acoustic sampler 130, a waypoint identifier 150, and a navigation interface 180. In operation, acoustic sampler 130 samples a microphone signal 120 and generates an acoustic signal 140; waypoint identifier 150 generates an identified waypoint 160 from acoustic signal 140 and flight plan 170; and navigation interface 180 incorporates identified waypoint 160 into flight plan 170 and transmits and receives navigation data 190 to and from aircraft navigation system 200. The transmitted portion of navigation data 190 includes, without limitation, flight plan 170; the received portion of navigation data 190 includes, without limitation, current aircraft position. To initialize flight plan 170, waypoint identifier 150 generates a first identified waypoint from acoustic signal 140 and from the current aircraft position.

In accordance with another embodiment of the present invention, acoustic sampler 130 additionally generates a speech flag signal 240 indicating which portions of acoustic signal 140 correspond to a combination of pilot speech and cabin noise and which portions correspond to cabin noise only. Waypoint identifier 150 then uses speech flag signal 240 to assist in generating identified waypoint 160.

Figure 2:
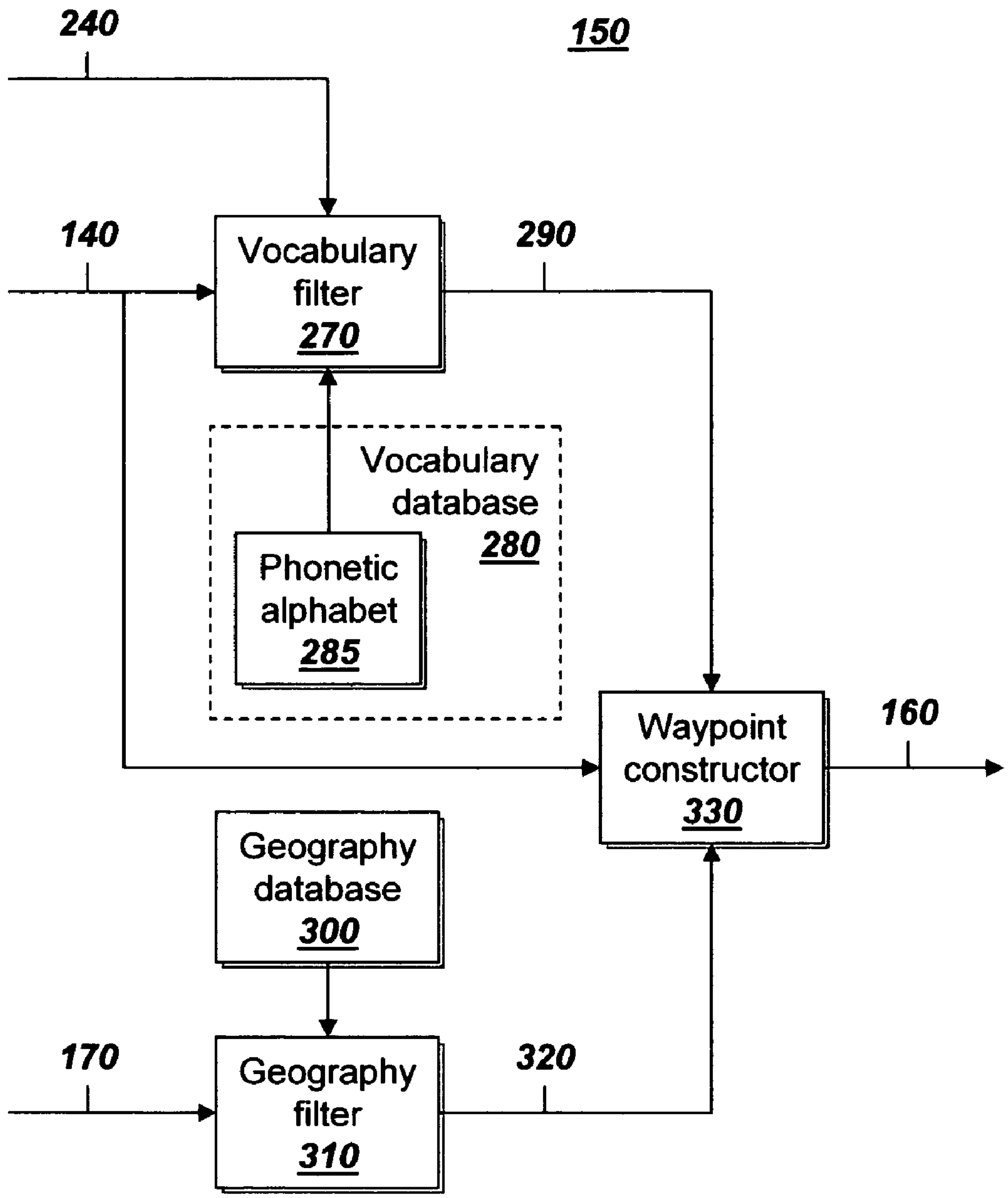
FIG. 2 illustrates a block diagram in accordance with a more specific embodiment of the embodiment of FIG. 1.

In accordance with a more specific embodiment of the embodiment of FIG. 1, FIG. 2 illustrates a block diagram wherein waypoint identifier 150 comprises a vocabulary filter 270, a geography filter 310, and a waypoint constructor 330. In operation, vocabulary filter 270 filters a vocabulary database 280 to yield a feasible vocabulary set 290; geography filter 310 filters a geography database 300 using flight plan 170 to yield a feasible waypoint set 320; and waypoint constructor 330 constructs identified waypoint 160 from feasible vocabulary set 290 and feasible waypoint set 320. In some embodiments, acoustic signal 140 and speech flag signal 240 are also used by vocabulary filter 270 to filter vocabulary database 280.

In accordance with a more specific embodiment of the embodiment of FIG. 2, vocabulary database 280 comprises a phonetic alphabet 285. Examples of phonetic alphabet 285 include, without limitation, the International Civil Aviation Organization alphabet wherein the words “alpha,” “bravo,” “charlie,” etc. respectively represent the letters “A,” “B,” “C,” etc.

Figure 3:
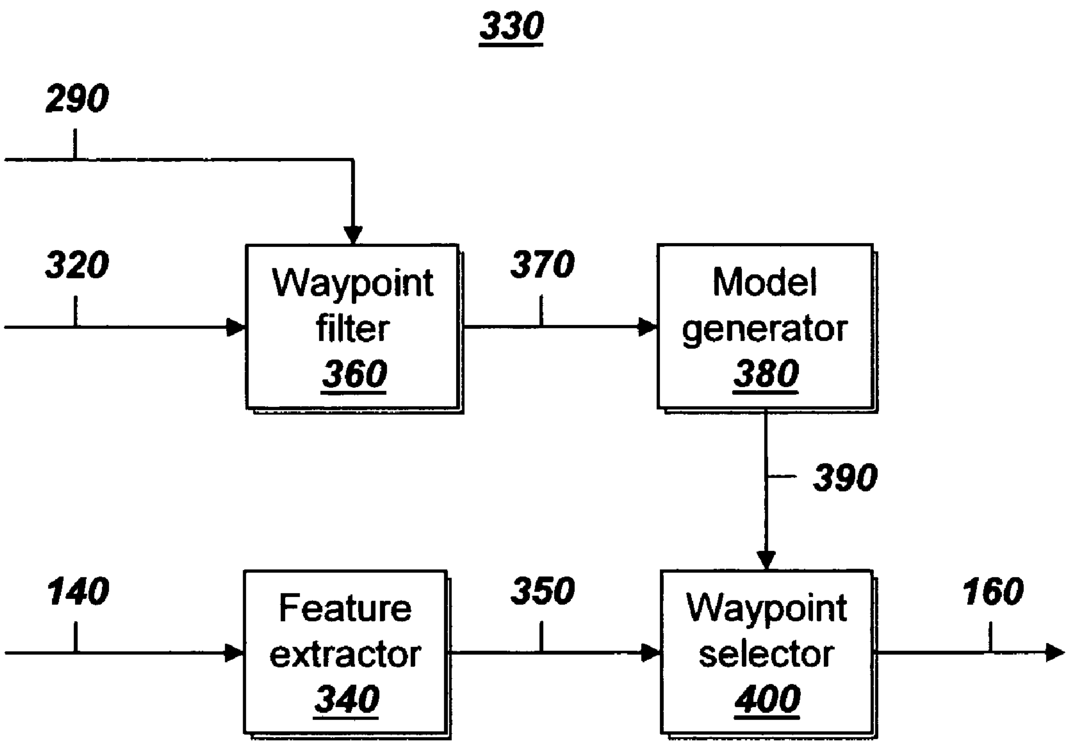
FIG. 3 illustrates a block diagram in accordance with a more specific embodiment of the embodiment of FIG. 2.

In accordance with a more specific embodiment of the embodiment of FIG. 2, FIG. 3 illustrates a block diagram wherein waypoint constructor 330 comprises a waypoint filter 360, a model generator 380, a feature extractor 340, and a waypoint selector 400. In operation, waypoint filter 360 filters feasible waypoint set 320 using feasible vocabulary set 290 to yield a candidate waypoint set 370; model generator 380 generates a waypoint model set 390 from candidate waypoint set 370; feature extractor 340 constructs a signal feature set 350 from acoustic signal 140; and waypoint selector 400 selects identified waypoint 160 by matching signal feature set 350 to an element of waypoint model set 390.

In accordance with a more detailed embodiment of the embodiment of FIG. 3, waypoint model set 390 comprises a set of hidden Markov word models. In some embodiments, each of the hidden Markov word models comprises a set of semi-hidden Markov triphone models. In some embodiments, waypoint selector 400 uses a Viterbi search method to match signal feature set 350 to an element of waypoint model set 390. Hidden Markov word models, semi-hidden Markov triphone models, and Viterbi searches are techniques known to persons of ordinary skill in the art of speech recognition and are described in any modern text on speech recognition.

In accordance with a more detailed embodiment of the embodiment of FIG. 3, feature extractor 340 uses a zero crossings with peak amplitudes (ZCPA) method. The ZCPA method is known to persons of ordinary skill in the art of speech recognition and is described in D. Kim, S. Lee, and R. M. Kil, "Auditory processing of speech signals for robust speech recognition in real-world noisy environments", IEEE Trans. Speech Audio Processing, vol. 7, no. 1, pp. 55–69, January 1999.

Figure 4:
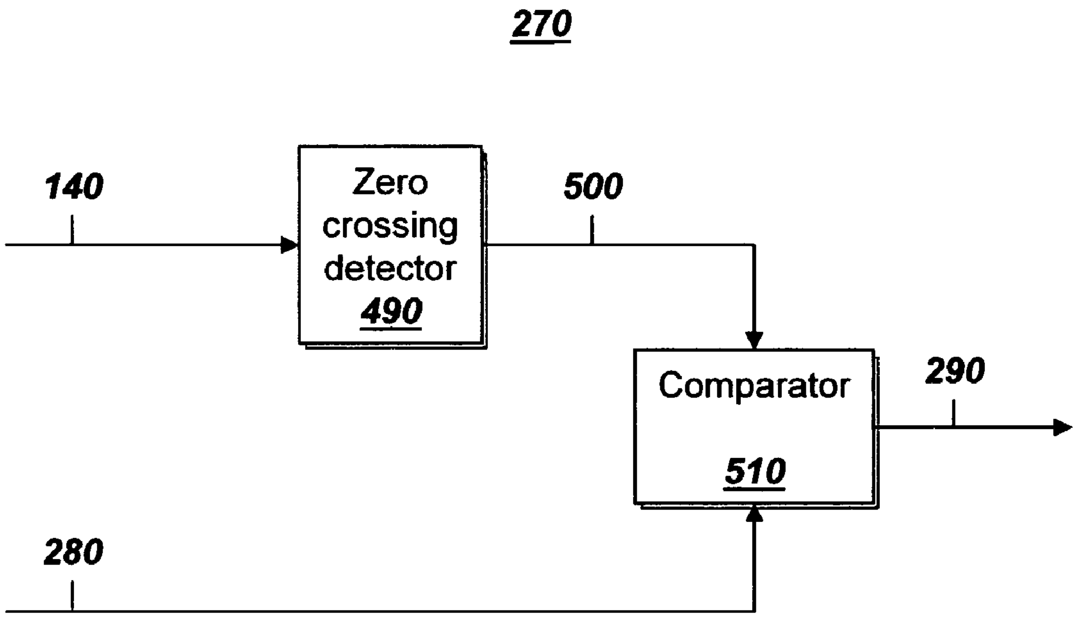
FIG. 4 illustrates a block diagram in accordance with another more specific embodiment of the embodiment of FIG. 2.

In accordance with another more specific embodiment of the embodiment of FIG. 2, FIG. 4 illustrates a block diagram wherein vocabulary filter 270 comprises a zero crossing detector 490 and a comparator 510. In operation, zero crossing detector 490 detects zero crossings of acoustic signal 140 to yield a zero crossing set 500. Comparator 510 compares zero crossing set 500 to zero crossing data from vocabulary database 280 to yield feasible vocabulary set 290.

Figure 5:
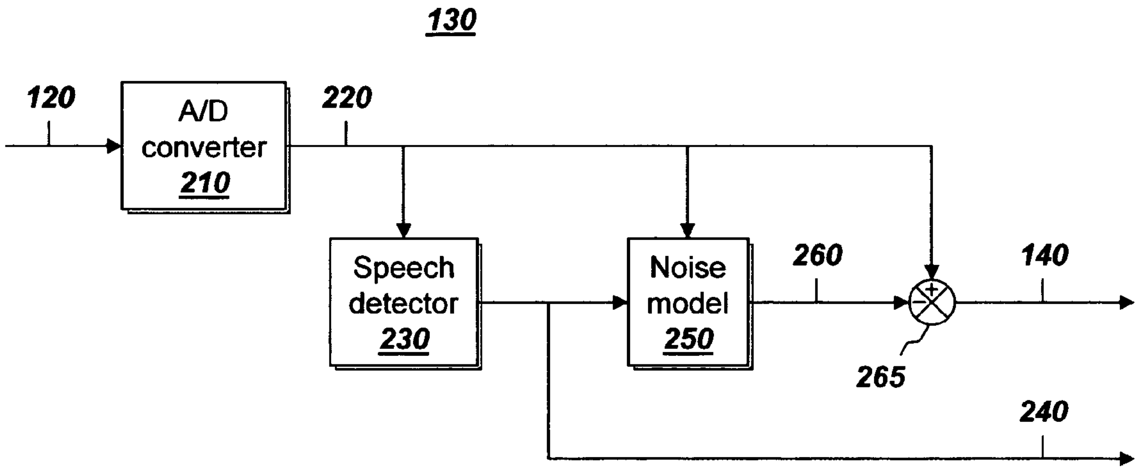
FIG. 5 illustrates a block diagram in accordance with another more specific embodiment of the embodiment of FIG. 1.

In accordance with another more specific embodiment of the embodiment of FIG. 1, FIG. 5 illustrates a block diagram wherein acoustic sampler 130 comprises an analog-to-digital converter 210, a speech detector 230, a noise model 250, and a subtracter 265. In operation, analog-to-digital converter 210 converts microphone signal 120 to a raw acoustic signal 220; speech detector 230 generates speech flag signal 240 from raw acoustic signal 220; noise model 250 generates a noise estimate 260 from raw acoustic signal 220 and speech flag signal 240; and subtracter 265 subtracts noise estimate 260 from raw acoustic signal 220 to yield acoustic signal 140.

In accordance with a more detailed embodiment of the embodiment of FIG. 5, speech detector 230 generates speech flag signal 240 using a linked hidden Markov model. Use of linked hidden Markov models for this purpose is known to persons of ordinary skill in the art of speech recognition and is described in S. Basu, "A linked-HMM model for robust voicing and speech detection", Proc. Int. Conf. Acoustic, Speech, and Signal Processing (ICASSP), vol. 1, pp. 816–819, 2003.

Figure 6:
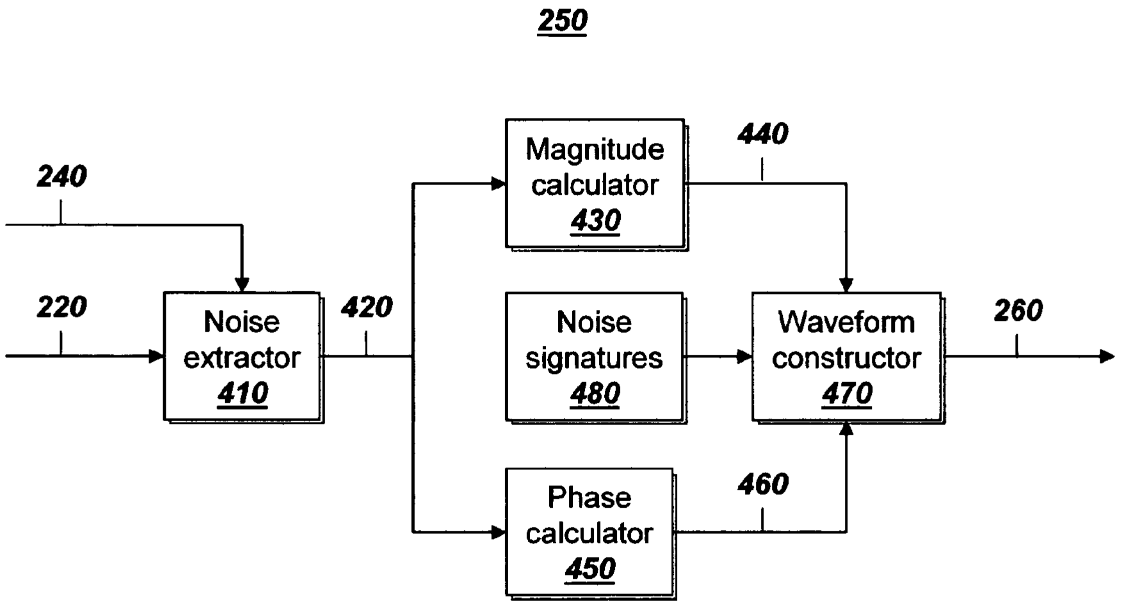
FIG. 6 illustrates a block diagram in accordance with a more specific embodiment of the embodiment of FIG. 5.

In accordance with a more specific embodiment of the embodiment of FIG. 5, FIG. 6 illustrates a block diagram wherein noise model 250 comprises a noise extractor 410, a magnitude calculator 430, a phase calculator 450, and a waveform constructor 470. In operation, noise extractor 410 extracts a cabin noise signal 420 from raw acoustic signal 220 using speech flag signal 240; magnitude calculator 430 calculates an estimated magnitude set 440 from cabin noise signal 420; phase calculator 450 calculates an estimated phase set 460 from cabin noise signal 420; and waveform constructor 470 constructs noise estimate 260 from a set of noise signatures 480 using estimated magnitude set 440 and estimated phase set 460.

All of the elements described above of embodiments of the present invention may be implemented, by way of example, but not limitation, using singly or in combination any electric or electronic devices capable of performing the indicated functions. Examples of such devices include, without limitation: analog devices; analog computation modules; digital devices including, without limitation, small-, medium-, and large-scale integrated circuits, application specific integrated circuits (ASICs), and programmable logic arrays (PLAs); and digital computation modules including, without limitation, microcomputers, microprocessors, microcontrollers, and programmable logic controllers (PLCs).

In some embodiments of the present invention, the elements described above are implemented as software components in a general purpose computer. In some embodiments, aircraft navigation system 200 is also a software component implemented in the same computer as apparatus 100. Such software implementations produce a technical effect of recognizing pilot speech and entering a flight plan into an aircraft navigation system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An apparatus for entering a flight plan into an aircraft navigation system, said apparatus comprising:

an acoustic sampler adapted for sampling a microphone signal and generating an acoustic signal;

a waypoint identifier adapted for generating an identified waypoint from said acoustic signal and said flight plan; and a navigation interface adapted for incorporating said identified waypoint into said flight plan and for transmitting and receiving navigation data to and from said aircraft navigation system, said acoustic sampler being further adapted to generate a speech flag signal indicating portions of said acoustic signal corresponding to combinations of pilot speech and cabin noise and portions of said acoustic signal corresponding to cabin noise only, said waypoint identifier being further adapted to generate said identified waypoint using said speech flag signal.

2. An apparatus for entering a flight plan into an aircraft navigation system, said apparatus comprising:

an acoustic sampler adapted for sampling a microphone signal and generating an acoustic signal;

a waypoint identifier adapted for generating an identified waypoint from said acoustic signal and said flight plan; and a navigation interface adapted for incorporating said identified waypoint into said flight plan and for transmitting and receiving navigation data to and from said aircraft navigation system, said waypoint identifier comprising:

a vocabulary filter adapted for filtering a vocabulary database to yield a feasible vocabulary set;

a geography filter adapted for filtering a geography database using said flight plan to yield a feasible waypoint set; and a waypoint constructor adapted for constructing said identified waypoint from said feasible vocabulary set and said feasible waypoint set.

3. The apparatus of claim 2 wherein said vocabulary database comprises a phonetic alphabet.

4. The apparatus of claim 2 wherein said vocabulary filter is further adapted for using said acoustic signal.

5. The apparatus of claim 2 wherein said waypoint constructor comprises:

a waypoint filter adapted for filtering said feasible waypoint set using said feasible vocabulary set to yield a candidate waypoint set;

a model generator adapted for generating a waypoint model set from said candidate waypoint set;

a feature extractor adapted for constructing a signal feature set from said acoustic signal; and a waypoint selector adapted for selecting said identified waypoint by matching said signal feature set to an element of said waypoint model set.

6. The apparatus of claim 5 wherein:

said waypoint model set comprises a set of hidden Markov word models;

each of said hidden Markov word models comprises a set of semi-hidden Markov triphone models; and said waypoint selector uses a Viterbi search method.

7. The apparatus of claim 5 wherein said feature extractor uses a zero crossings with peak amplitudes method.

8. The apparatus of claim 2 wherein said vocabulary filter comprises:

a zero crossing detector adapted for detecting zero crossings of said acoustic signal to yield a zero crossing set; and a comparator adapted for comparing said zero crossing set to zero crossing data from said vocabulary database to yield said feasible vocabulary set.

9. An apparatus for entering a flight plan into an aircraft navigation system, said apparatus comprising:

an acoustic sampler adapted for sampling a microphone signal and generating an acoustic signal;

a waypoint identifier adapted for generating an identified waypoint from said acoustic signal and said flight plan; and a navigation interface adapted for incorporating said identified waypoint into said flight plan and for transmitting and receiving navigation data to and from said aircraft navigation system, said acoustic sampler comprising:

an analog-to-digital converter adapted for converting said microphone signal to a raw acoustic signal;

a speech detector adapted for generating a speech flag signal from said raw acoustic signal, said speech flag signal indicating portions of said acoustic signal corresponding to combinations of pilot speech and cabin noise and portions of said acoustic signal corresponding to cabin noise only;

a noise model adapted for generating a noise estimate from said raw acoustic signal and said speech flag signal; and a subtracter adapted for subtracting said noise estimate from said raw acoustic signal to yield said acoustic signal.

10. The apparatus of claim 9 wherein said speech detector is further adapted for generating said speech flag signal using a linked hidden Markov model.

11. The apparatus of claim 9 wherein said noise model comprises:

a noise extractor adapted for extracting a cabin noise signal from said raw acoustic signal using said speech flag signal;

a magnitude calculator adapted for calculating an estimated magnitude set from said cabin noise signal;

a phase calculator adapted for calculating an estimated phase set from said cabin noise signal; and a waveform constructor adapted for constructing said noise estimate from a set of noise signatures using said estimated magnitude set and said estimated phase set.

12. A method for entering a flight plan into an aircraft navigation system, said method comprising the acts of:

sampling a microphone signal;

generating an acoustic signal from said microphone signal;

generating an identified waypoint from said acoustic signal and said flight plan;

incorporating said identified waypoint into said flight plan; and transmitting and receiving navigation data to and from said aircraft navigation system, said act of generating said acoustic signal further comprising generating a speech flag signal indicating portions of said acoustic signal corresponding to combinations of pilot speech and cabin noise and portions of said acoustic signal corresponding to cabin noise only, said act of generating said identified waypoint further comprising using said speech flag signal.

13. A method for entering a flight plan into an aircraft navigation system, said method comprising the acts of:

sampling a microphone signal;

generating an acoustic signal from said microphone signal;

generating an identified waypoint from said acoustic signal and said flight plan;

incorporating said identified waypoint into said flight plan; and transmitting and receiving navigation data to and from said aircraft navigation system, said act of generating said identified waypoint comprising:

filtering a vocabulary database to yield a feasible vocabulary set;

filtering a geography database using said flight plan to yield a feasible waypoint set; and constructing said identified waypoint from said feasible vocabulary set and said feasible waypoint set.

14. The method of claim 13 wherein said vocabulary database comprises a phonetic alphabet.

15. The method of claim 13 wherein said act of filtering said vocabulary database comprises using said acoustic signal.

16. The method of claim 13 wherein said act of constructing said identified waypoint comprises:

filtering said feasible waypoint set using said feasible vocabulary set to yield a candidate waypoint set;

generating a waypoint model set from said candidate waypoint set;

constructing a signal feature set from said acoustic signal; and selecting said identified waypoint by matching said signal feature set to an element of said waypoint model set.

17. The method of claim 16 wherein:

said waypoint model set comprises a set of hidden Markov word models;

each of said hidden Markov word models comprises a set of semi-hidden Markov triphone models; and said act of selecting said identified waypoint comprises using a Viterbi search method.

18. The method of claim 16 wherein said act of constructing said signal feature set comprises using a zero crossings with peak amplitudes method.

19. The method of claim 13 wherein said act of filtering said vocabulary database comprises:

detecting zero crossings of said acoustic signal to yield a zero crossing set; and comparing said zero crossing set to zero crossing data from said vocabulary database to yield said feasible vocabulary set.

20. A method for entering a flight plan into an aircraft navigation system, said method comprising the acts of:

sampling a microphone signal;

generating an acoustic signal from said microphone signal;

generating an identified waypoint from said acoustic signal and said flight plan;

incorporating said identified waypoint into said flight plan; and transmitting and receiving navigation data to and from said aircraft navigation system, said act of generating said acoustic signal comprising:

converting said microphone signal to a raw acoustic signal;

generating a speech flag signal from said raw acoustic signal, said speech flag signal indicating portions of said acoustic signal corresponding to combinations of pilot speech and cabin noise and portions of said acoustic signal corresponding to cabin noise only;

generating a noise estimate from said raw acoustic signal and said speech flag signal; and subtracting said noise estimate from said raw acoustic signal to yield said acoustic signal.

21. The method of claim 20 wherein said act of generating said speech flag signal further comprises using a linked hidden Markov model.

22. The method of claim 20 wherein said act of generating said noise estimate comprises:

extracting a cabin noise signal from said raw acoustic signal using said speech flag signal;

calculating an estimated magnitude set from said cabin noise signal;

calculating an estimated phase set from said cabin noise signal; and constructing said noise estimate from a set of noise signatures using said estimated magnitude set and said estimated phase set.

* * * * *